(12) United States Patent
Kim (10) Patent No.: US 8,767,090 B2
(45) Date of Patent: Jul. 1, 2014

(54) PHOTOGRAPHING APPARATUS AND METHOD THAT COMBINE IMAGES TO IMPROVE EXPOSURE

(75) Inventor: Young-geol Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 297 days.

(21) Appl. No.: 12/724,525

(22) Filed: Mar. 16, 2010

(65) Prior Publication Data

US 2010/0328494 A1 Dec. 30, 2010

(30) Foreign Application Priority Data

Jun. 25, 2009 (KR) .................. 10-2009-0057203

(51) Int. Cl.
*H04N 5/235* (2006.01)
*H04N 5/228* (2006.01)
*H04N 3/14* (2006.01)

(52) U.S. Cl.
USPC ............... 348/229.1; 348/222.1; 348/295

(58) Field of Classification Search
USPC ................. 348/222.1, 229.1, 295
See application file for complete search history.

(56) References Cited

U.S. PATENT DOCUMENTS

| 6,075,905 | A | * | 6/2000 | Herman et al. ............. 382/284 |
| 7,852,401 | B2 | | 12/2010 | Hamamura et al. |
| 8,169,537 | B2 | | 5/2012 | Ohki |
| 2002/0057473 | A1 | * | 5/2002 | Umeyama ............... 358/909.1 |
| 2003/0146981 | A1 | * | 8/2003 | Bean et al. ............... 348/222.1 |
| 2004/0027488 | A1 | * | 2/2004 | Messina et al. ............ 348/584 |
| 2007/0229699 | A1 | * | 10/2007 | Hamamura et al. ......... 348/362 |
| 2009/0244317 | A1 | * | 10/2009 | Makii ..................... 348/229.1 |

FOREIGN PATENT DOCUMENTS

| JP | 2003-319269 A | 11/2003 |
| KR | 10-2007-0085054 A | 8/2007 |
| KR | 10-2007-0099394 A | 10/2007 |
| KR | 10-2009-0028252 A | 3/2009 |

* cited by examiner

*Primary Examiner* — Joel Fosselman
(74) *Attorney, Agent, or Firm* — Drinker Biddle & Reath LLP (57) ABSTRACT

A photographing apparatus and method. The apparatus including: an image pickup unit configured to capture an image of a subject to create image data; a image pickup unit controller configured to set a photographing time that is longer than an exposure time required for photographing the subject, and configured to divide the overall photographing time into a plurality of unit photographing times, and configured to control the image pickup unit to sequentially perform a plurality of unit photographing operations corresponding to the plurality of unit photographing times to create unit images; a storage unit; a user inputting unit; an image synthesis unit configured to sum up the image data of the unit images to create preparatory images and configured to sum up the unit images of a preparatory image to create a final image; and a display unit configured to display the preparatory images and the final image.

16 Claims, 8 Drawing Sheets

PHOTOGRAPHING APPARATUS AND METHOD THAT COMBINE IMAGES TO IMPROVE EXPOSURE

CROSS-REFERENCE TO RELATED PATENT APPLICATION

This application claims the benefit of Korean Patent Application No. 10-2009-0057203, filed on Jun. 25, 2009, in the Korean Intellectual Property Office, the entire contents of which is incorporated herein by reference.

BACKGROUND OF THE INVENTION

1. Field of the Invention

The present invention relates to a photographing apparatus and method, and more particularly, to a photographing apparatus and method by which an overall photographing time is divided into a plurality of unit photographing times so as to sequentially perform a plurality of unit photographing operations and some unit images created by sequentially performing the unit photographing operations are summed up so that photographing can be performed with improved exposure.

2. Description of the Related Art

Exposure is an operation of exposing an image pickup unit or film to a quantity of light that is appropriate for photosensitization of the image pickup unit or a film. Generally, correct exposure can be achieved by properly adjusting an aperture and a shutter and by properly controlling ISO film sensitivity. When photographing is performed using a photographing device such as a digital camera, photographing conditions such as shutter speed, a diaphragm value, sensitivity, etc., are automatically determined or are input by a user.

When photographing is performed after exposure conditions for photographing are automatically determined or manually input by a user, exposure may not be properly performed and a defective photo may be obtained. In a case when the exposure state of a captured image is not good, a function of subsequently correcting the captured image by using a gamma curve after photographing the exposure state of the captured image may be used. However, such subsequent image correction is used to supplement an image that has already been created by photographing. Thus, gamma curve correction is not sufficient to satisfy desires of users who want to capture an image having a good exposure state.

Another solution that is sometimes employed is using a bracketing function. The bracketing function obtains images of a subject under various exposure conditions by performing multiple photographing operations according to various exposure conditions. The user may then select a proper image from among the images captured by the bracketing function. However, the images are sequentially captured using the bracketing function at time intervals and thus, when a scene in which a subject moves quickly is photographed, a user may not photograph at an instant that is appropriate for photographing.

Also, when an unintended subject comes within the field of vision during photographing, both an intended subject and the unintended subject are photographed and thus, photographing needs to be performed again. Accordingly, the user may not photograph at an instant that is appropriate for photographing.

SUMMARY OF THE INVENTION

A photographing apparatus is provided. The photographing apparatus includes an image pickup unit configured to capture an image of a subject to create image data; a image pickup unit controller configured to set a photographing time that is longer than an exposure time required for photographing the subject, and configured to divide the overall photographing time into a plurality of unit photographing times, and configured to control the image pickup unit to sequentially perform a plurality of unit photographing operations corresponding to the plurality of unit photographing times to create unit images; a storage unit configured to store image data of the unit images created by performing the plurality of unit photographing operations; a user inputting unit configured to receive a user's input; an image synthesis unit configured to sum up the image data of the unit images to create preparatory images and configured to in response to user input to sum up the unit images of a preparatory image to create a final image; and a display unit configured to display the preparatory images and display the final image.

The final image may have a higher resolution than that of the preparatory image.

At least two of the preparatory images may be created by summing a different number of unit images.

At least two of the preparatory images may be created by summing unit images beginning at the same starting unit image in the sequentially created unit images.

At least two of the preparatory images may be created by summing unit images beginning at the same starting unit image in the sequentially created unit images and the number of unit images used to create the at least two preparatory images is different.

The photographing apparatus may include a movement detector configured to detect movement of the subject from the unit images; and the image synthesis unit may exclude unit images in which the movement detector has detected movement of the subject.

The image synthesis unit may determine a number of the unit images to be included in the preparatory image based on the input signal of the user inputting unit.

The display unit may display symbols or characters corresponding to the unit images over the overall photographing time. The image synthesis unit may determine the number of the unit images to be included in the preparatory image and starting points of the unit images for use in synthesis according to the input signal of the user inputting unit.

A photographing method is provided. The method includes calculating an exposure value for photographing; setting an overall photographing time based on the exposure value and dividing the overall photographing time into a plurality of unit photographing times; sequentially performing a plurality of unit photographing operations to correspond to the plurality of unit photographing times and storing image data of the unit images created by performing the plurality of unit photographing operations; summing up image data of the unit images that are present in different time periods of the overall photographing time to create preparatory images; displaying the preparatory images; creating a final image by selecting one from among the preparatory images; and displaying the final image.

The final image may have better resolution than that of the preparatory image.

The number of unit images included in the preparatory images may be different.

Starting points of the unit images included in the preparatory images may be the same.

Starting points of the unit images of the preparatory images may be different, and numbers of unit images included in the preparatory images may be the same.

The photographing method may include detecting movement of the subject from the image data of the unit images. The creating of the preparatory images may comprise creating the preparatory images by excluding a time period in which movement of the subject is detected.

The photographing method may include receiving a user's input. The creating of the preparatory images may include determining a number of the unit images to be included in the preparatory image based on the user's input.

The photographing method may include receiving a user's input, wherein the displaying of the preparatory images comprises displaying symbols or characters corresponding to the unit images during the overall photographing time, and the creating of the preparatory images comprises determining the number of the unit images to be included in the preparatory image and starting points of the unit images for use in synthesis based on the user's input.

A photographing method may include performing unit photographing operations, each unit photographing operation for a unit of time and each photographing operation creating a unit image; displaying representations of the created unit images; and responsive to a selection of representations of the created unit images, summing the unit images corresponding to the selected representations and displaying the summed unit images.

The photographing method may include calculating an exposure value for photographing; and wherein performing unit photographing operations, may include performing unit photographing operations for at least as long as the exposure value, each photographing operation for a unit of time less than the exposure value and each photographing operation creating a unit image.

The photographing method may include responsive to a selection from a user, creating a final image from the created unit images corresponding to the selected representations and displaying the final image.

The photographing method may include detecting movement of a subject from the unit images, and displaying representations of the created unit images, may include displaying representations of the created unit images indicating which of the created unit images includes detected movement of the subject.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore there is a need in the art for a photographing apparatus which includes an image pickup unit configured to capture an image of a subject to create image data; a image pickup unit controller configured to set a photographing time that is longer than an exposure time required for photographing the subject, and configured to divide the overall photographing time into a plurality of unit photographing times, and configured to control the image pickup unit to sequentially perform a plurality of unit photographing operations corresponding to the plurality of unit photographing times to create unit images; a storage unit configured to store image data of the unit images created by performing the plurality of unit photographing operations; a user inputting unit configured to receive a user's input; an image synthesis unit configured to sum up the image data of the unit images to create preparatory images and configured to in response to user input to sum up the unit images of a preparatory image to create a final image; and a display unit configured to display the preparatory images and display the final image. And for photographing methods for controlling the apparatus.

The photographing apparatus and methods provide the benefit that failure of exposure control may be lessened when photographing is performed. Additionally, the photographing apparatus and methods may provide the benefit of permitting a user to select exposure conditions when photographing is performed.

Hereinafter, the present invention will be described in detail by explaining exemplary embodiments with reference to the attached drawings. Like reference numerals in the drawings denote like elements.

Figure 1:
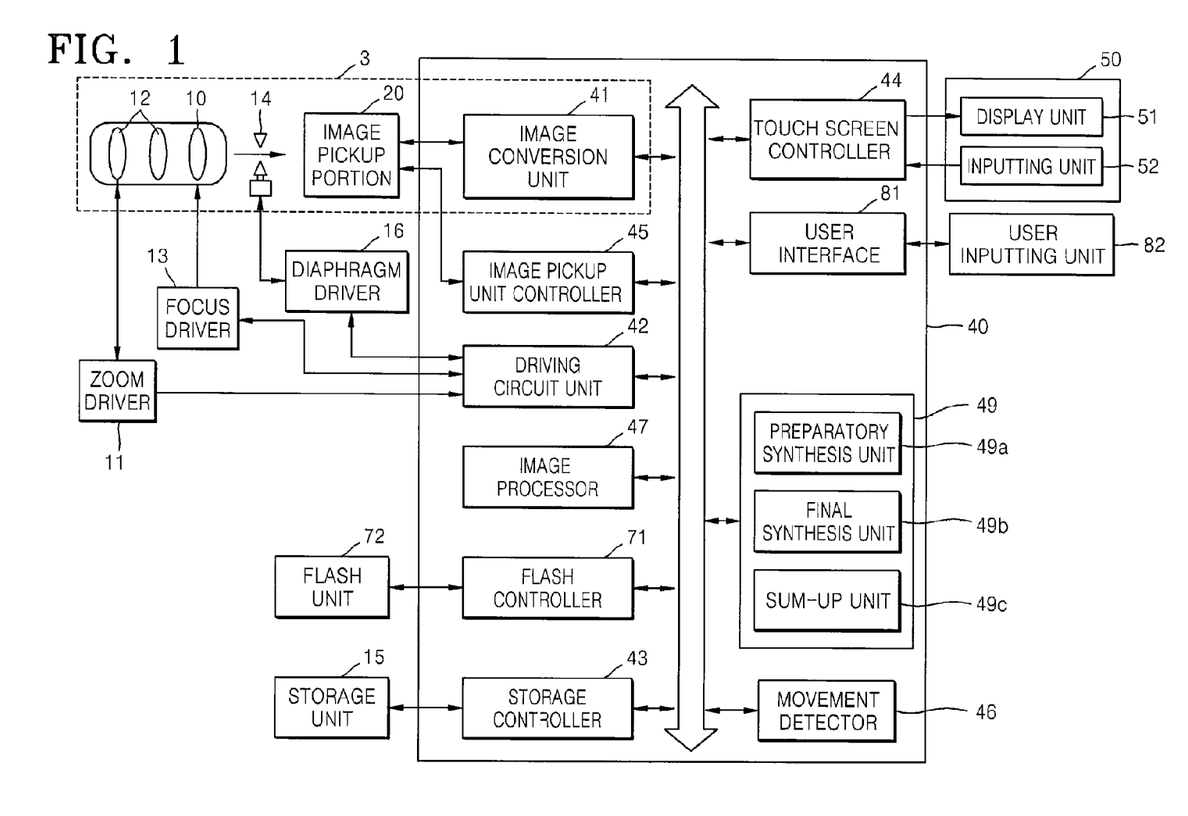
FIG. 1 is a block diagram of an example of a photographing apparatus.

FIG. 1 is a block diagram of an example of a photographing apparatus. Referring to FIG. 1, the photographing apparatus includes an image pickup unit 3 capturing an image of a subject to create image data, an image pickup unit image pickup unit controller 45 controlling the image pickup unit 3 to perform a plurality of unit photographing operations, a storage unit 15 storing image data of unit images that are created by sequentially performing the unit photographing operations, a user inputting unit 82 with which a user inputs, an image synthesis unit 49 summing up the image data of the unit images to create preparatory images and a final image, and a display unit 51 displaying the preparatory images and the final image.

In detail, the photographing apparatus having the above structure divides an overall photographing time into a plurality of unit photographing times so as to perform a plurality of unit photographing operations and selects one from among the preparatory images created using the unit images that are created by sequentially performing the unit photographing operations to create the final image, thereby minimizing failure of exposure control and performing optimum photographing.

The image pickup unit 3 includes an image pickup portion 20 capturing an image of a subject and converting an optical signal output from the image of the subject into an electrical signal, an optical system 10 disposed in front of the image pickup portion 20, and an image conversion unit 41 converting the electrical signal of the image pickup portion 20 into image data.

The optical system 10 disposed in front of the image pickup portion 20 includes a plurality of lenses 12 and performs a function of forming external light as an image on an image pickup side of the image pickup portion 20. Lenses 12 are disposed so that distances therebetween can be varied. If the distances between the lenses 12 vary, the zoom magnification or focus of the optical system 10 may be adjusted.

The lenses 12 are driven by a zoom driver 11 or a focus driver 13 having a driving unit such as a motor so that positions of the lenses 12 can be varied. The lenses 12 include a zoom lens increasing or reducing the size of the subject and a focus lens adjusting the focus of the subject. The zoom driver 11 and the focus driver 13 operate according to a control signal applied by a driving circuit unit 42. Thus, the zoom driver 11 may drive the optical system 10 so that the optical system 10 has one of a plurality of enlargement magnifications. Also, the focus driver 13 may drive the optical system 10 so that the optical system 10 can adjust the focus on the subject. A diaphragm 14 is a mechanism for adjusting the quantity of transmitted light and is driven by a diaphragm driver 16.

The image pickup unit 20 includes a photoelectric conversion unit such as a charge coupled device (CCD) or a complementary metal oxide semiconductor (CMOS) converting light that is incident via the optical system 10 into an image signal, which is an electrical signal. An operation of converting light into an electrical signal includes sub-operations of converting light into an analog signal, converting the analog signal into a digital signal, and signal processing such as pixel defect correction, gain correction, white balance correction, and gamma correction of the digital signal. An image processor 47 performs some of the sub-operations so that the image data can be displayed on the display unit 51 or stored in the storage unit 15.

The image conversion unit 41 converts the electrical signal generated by the image pickup portion 20 into image data that can be image processed. The image data created by the image conversion unit 41 may be stored in the storage unit 15 and may be used by the image synthesis unit 49 or the image processor 47.

The control unit 40 is electrically connected to the image pickup portion 20, the zoom driver 11, the focus driver 13, the diaphragm driver 16, a flash unit 72, the storage unit 15, a touch screen 50, and the user inputting unit 82. In order to control operations of the elements of the control unit 40, the control unit 40 performs a function of exchanging a control signal with the elements or a function of processing data. The control unit 40 includes the image conversion unit 41, the driving circuit unit 42, a touch screen controller 44, a storage controller 43 controlling storage of data in the storage unit 15, the image pickup unit controller 45, the image processor 47, the image synthesis unit 49, a movement detector 46, a flash controller 71, and a user interface 81.

The control unit 40 may be implemented by a micro-chip or a circuit board including the micro-chip, and the elements of the control unit 40 may be implemented by software or circuits embedded in the control unit 40.

The image pickup unit controller 45 controls the image pickup portion 20 so as to perform photographing. The image pickup unit controller 45 generates a photographing signal when a user operates a shutter (not illustrated), thereby controlling the image pickup portion 20 to sequentially perform a plurality of unit photographing operations. Also, the image pickup unit controller 45 performs unit photographing without using the shutter (not illustrated). For example, when a preview image that is input via the image pickup portion 20 is appropriate for a preset photographing mode, the image pickup unit controller 45 may perform photographing automatically.

In the photographing apparatus of FIG. 1, after a plurality of unit photographing operations are sequentially performed, a plurality of unit images that are created by sequentially performing the unit photographing operations are summed up so that a final image can be created.

Figure 2:
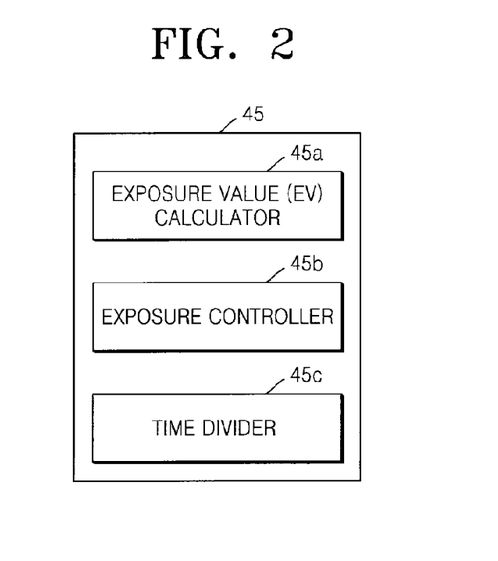
FIG. 2 is a block diagram of an example of an image pickup unit controller of the photographing apparatus shown in FIG. 1, according to an embodiment of the present invention.

FIG. 2 is a block diagram of an example of the image pickup unit controller 45 of the photographing apparatus shown in FIG. 1. Referring to FIG. 2, the image pickup unit controller 45 according includes an exposure value (EV) calculator 45a, an exposure controller 45b, and a time divider 45c. The exposure calculator 45a performs automatic exposure to calculate an exposure value (EV). The exposure controller 45b sets an appropriate diaphragm value and an appropriate shutter speed based on the calculated EV.

The time divider 45c sets a longer time than an exposure time required for photographing as an overall photographing time and divides the overall photographing time into a plurality of unit photographing times to determine a timing at which each unit photographing operation is performed. Due to the operation of the time divider 45c, the number of the unit photographing operations to be sequentially performed for the overall photographing time may be determined. The image pickup unit controller 45 controls the image pickup portion 20 to sequentially perform the unit photographing operations at a time determined by the time divider 45c. Each unit photographing operation is performed with exposure corresponding to a unit photographing time.

Referring back to FIG. 1, the storage controller 43 controls storing of image data in the storage unit 15 or reading of the image data or setting information stored in the storage unit 15. The storage unit 15 may be a semiconductor memory device such as a synchronous dynamic random access memory (SDRAM), which stores data of a captured image.

If a unit photographing operation is performed by the image pickup portion 20, a unit image corresponding to a unit photographing time is captured and is converted into image data. Image data of each unit image may be stored in the storage unit 15. The image data of the unit images stored in the storage unit 15 may be synthesized to preparatory images or a final image by the image synthesis unit 49.

The image synthesis unit 49 sums up the image data of the unit images stored in the storage unit 15 to create the preparatory images and finally sums up unit images of a preparatory image selected from among the created preparatory images to create a final image. The preparatory images are synthesized by summing up image data of unit images that are present in different time periods of the overall photographing time. The preparatory images are provided to select an image with optimum exposure as the user wishes, and thus may have relatively low resolution as compared to that of the final image that is finally created.

The image synthesis unit 49 includes a preparatory synthesis unit 49a, a final synthesis unit 49b, and a sum-up unit 49c. The preparatory synthesis unit 49a reads the image data of the unit images stored in the storage unit 15 by using a sub-sampling method and prepares creation of an image that is appropriate for display on the display unit 51. The preparatory synthesis unit 49a reads the image data of the unit images that are present in different time periods of the overall photographing time from the storage unit 15, and the sum-up unit 49c sums up the image data read by the preparatory synthesis unit 49a to create the preparatory images.

The final synthesis unit 49b reads the image data of the unit images stored in the storage unit 15 by using a progressive scanning method and prepares creation of the final image to be finally stored in the storage unit 15. The final synthesis unit 49b reads the image data of the unit images included in the preparatory image selected from among the storage unit 15, and the sum-up unit 49c sums up the image data read by the final synthesis unit 49b to create the final image. Thus, the preparatory images created by the preparatory synthesis unit 49a may have relatively low resolution as compared to that of the final image created by the final synthesis unit 49b.

The flash controller 71 outputs a control signal that is used to drive the flash unit 72. The flash unit 72 emits a predetermined quantity of light toward the subject at a predetermined time, according to instructions of the flash controller 71.

The touch screen 50 includes the display unit 51 displaying an image defined by the image data and an inputting unit 52 that allows part of the image displayed on the display unit 51 to be selected. The touch screen 50 performs a function of displaying an image captured by the image pickup portion 20 and a function of sensing a touch of the surface of the display unit 51 and generating a signal corresponding to the sensed position of the display unit 51.

The touch screen 50 is an inputting device that replaces a keyboard and a mouse. A surface of the display unit 51 may be touched with a user's finger or by using a touch pen and the user can carry out intuitive work in a graphic user interface (GUI) environment. A liquid crystal display (LCD) or an organic light emitting display (OLED) may be used as the display unit 51 of the touch screen 50.

The inputting unit 52 is installed at the surface of the display unit 51, senses a touch to the surface of the display unit 51 and is an example of the user inputting unit 82 of the photographing apparatus of FIG. 1. Several types of technologies such as a resistance sensing unit, a capacitive sensing unit, a surface acoustic wave sensing unit, an infrared light sensing unit, and an optical sensing unit may be used as the inputting unit 52.

The user contacts the inputting unit 52 of the touch screen 50 to select a menu from among some images displayed on the display unit 51 or to designate a block (starting points of unit images or the number of unit images) of unit images to be included in the preparatory images. Signal transmission between the touch screen 50 and the control unit 40 may be performed by the touch screen controller 44.

The user inputting unit 82 is installed to be separated from the touch screen 50, receives a user's input and generates an input signal. The user inputting unit 82 may be implemented in various ways. For example, the user inputting unit 82 may be a menu button or a dial. Another type of the user inputting unit 82 is operated to designate a confirmation region. Also, the user inputting unit 82 may be a voice recognition unit recognizing a user's voice. Signal transmission between the user inputting unit 82 and the control unit 40 may be performed by the user interface 81.

The user operates the inputting unit 52 of the touch screen 50 or the user inputting unit 82 to determine the starting point of the unit images to be included in the preparatory images and the number of the unit images. The image synthesis unit 49 synthesizes the preparatory images based on the starting points of the unit images and the number of the unit images, which are determined by the user, and the display unit 51 displays the synthesized preparatory images.

The movement detector 46 performs a function of detecting the movement of the subject from the image data. The unit images which are detected by the movement detector 46 and in which the subject moves rapidly, may not be included in the preparatory images.

Figure 3:
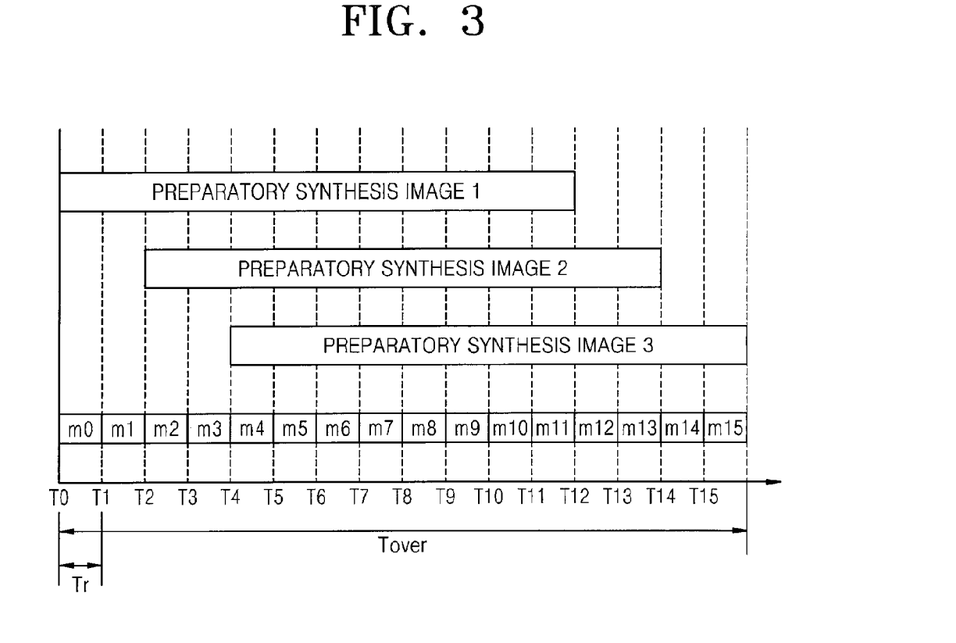
FIG. 3 is an example of a conceptual diagram illustrating a photographing operation performed in the photographing apparatus of FIG. 1.

FIG. 3 is a conceptual diagram illustrating an example of a photographing operation performed in the photographing apparatus of FIG. 1. Referring to FIG. 3, an overall photographing time Tover when unit photographing operations are sequentially performed, is set to be longer than a photographing time T that is required for photographing (Tover>T). The photographing time T may be determined by the above-described exposure controller 45b. The overall photographing time Tover is divided into a plurality of unit photographing times Tr. The unit photographing time Tr corresponds to a time at which a unit photographing operation is performed. The unit photographing operations are sequentially performed during the overall photographing time Tover, and all of the unit photographing operations may be performed at the same time interval of the unit photographing time Tr. In other examples, time intervals for unit photographing operations may be different.

Referring to FIG. 3, the unit photographing operations are sequentially performed at each of the unit photographing times when the overall photographing time Tover is divided into the unit photographing times Tr. In each of the unit photographing operations, exposure is performed only during the short unit photographing time Tr, and thus each of unit images m0 to m15 is photographed by performing the unit photographing operations with less exposure, and several pieces of the unit images m0 to m15 are summed up so that images having sufficient exposure can be created.

Preparatory synthesis images 1 to 3 are examples of preparatory images that are created so as to create a final image. Numbers of unit images included in the preparatory synthesis images 1 to 3 are different from each other. Starting points of the unit images included in the preparatory synthesis images 1 to 3 are respectively T0, T2, and T4 and thus are different. Times T0 to T12, which correspond to the length of the preparatory synthesis image 1, are the photographing time T required for photographing.

The preparatory synthesis images 1 to 3 are created by summing up image data of unit images that are present in different time periods of the overall photographing time Tover. Thus, the user may select one from among the preparatory synthesis images 1 to 3 so as to create the final image. Thus, the user may select the preparatory images for optimum exposure after operating the shutter (not illustrated) and performing a photographing operation so that failure of exposure control during a photographing operation can be minimized. Also, the user can select exposure conditions freely.

Figure 4:
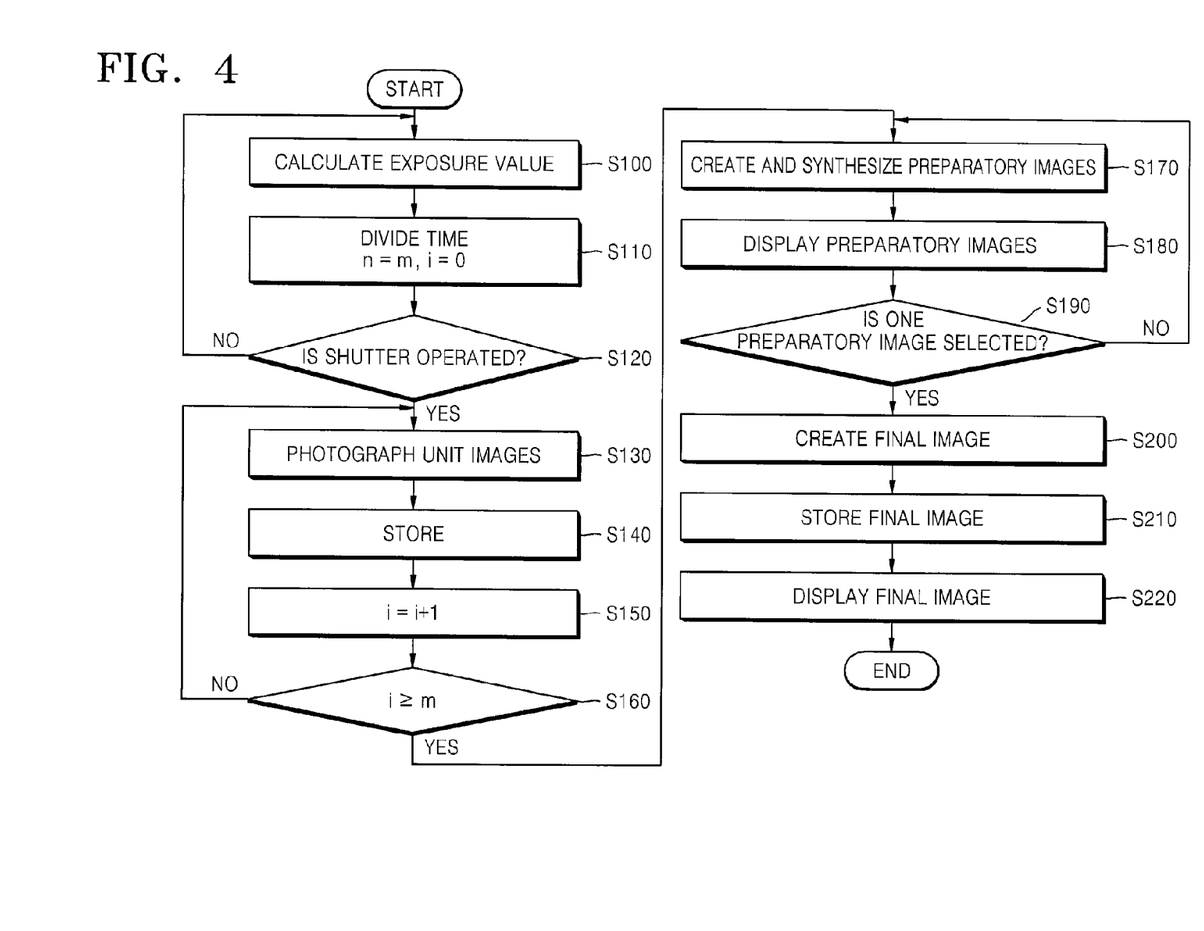
FIG. 4 is an example of a flowchart illustrating a photographing method.

FIG. 4 is a flowchart illustrating an example of a photographing method. Referring to FIG. 4, the photographing method according to the present embodiment includes determining an exposure value (EV) for photographing (S100), determining the number n of photographing operations for a plurality of unit photographing operations (S110), photographing and storing unit images (S130 and S140), creating and synthesizing preparatory images (S170), displaying the preparatory images (S180), and creating a final image by synthesizing the preparatory images (S200).

In Operation S100, automatic exposure is performed to calculate the exposure value (EV) and an appropriate diaphragm value and shutter speed are set based on the calculated EV so as to determine a photographing time T required for photographing.

In Operation S110, an overall photographing time Tover required for unit photographing is determined based on the calculated EV and the photographing time T. The overall photographing time Tover may be set to be longer than the photographing time T corresponding to an exposure time required for photographing. The overall photographing time Tover is divided into a plurality of unit photographing times Tr so that the number m of a plurality of unit photographing operations can be determined.

After the number m of the unit photographing operations is determined, in Operation S120, if a shutter (not illustrated) is operated, in Operation S130, the unit images are captured by the number m of the unit photographing operations, and in Operation S140, image data of the captured unit images are stored.

In Operation S150, a variable i that is initially set to 0 is increased by 1 whenever Operations S130 and S140 are repeatedly performed, and in Operation S160, if photographing is performed by the number m of the unit photographing operations, in Operation S170, preparatory images are created and synthesized.

In detail, in Operation S170, image data of the unit images stored in a storage unit such as the storage unit 15 of FIG. 1 are read using a sub-sampling method, and creation of an image that is appropriate for display on a display unit such as the display unit 51 of FIG. 1 is performed. The preparatory images are synthesis images that are created by summing up image data of the unit images that are present in different time periods of the overall photographing time Tover.

In Operation S180, the created preparatory images are displayed. In detail, the created preparatory images may be displayed in parallel on a display unit such as the display unit 51 of FIG. 1 or sequentially displayed on the display unit at time intervals. Alternatively, the preparatory images may be sequentially displayed when the user operates a menu button (not illustrated). In Operation S190, the user selects one from among the preparatory images displayed on the display unit.

In Operation S200, the unit images included in the preparatory image selected by the user are summed up to create a final image. In detail, in Operation S200, the image data of the unit images stored in a storage unit such as the storage unit 15 of FIG. 1 are read using a progressive scanning method, and creation of the final image to be finally stored in the storage unit is prepared. In other words, in Operation S200, the image data of the unit images included in the selected preparatory image are read from the storage unit and are summed up to create the final image. Thus, the preparatory images created in Operation S170 may have relatively low resolution as compared to that of the final image created in Operation S200.

The created final image may be stored in a storage unit such as the storage unit 15 of FIG. 1 (S210) and displayed on a display unit such as the display unit 51 of FIG. 1 (S220).

Figure 5:
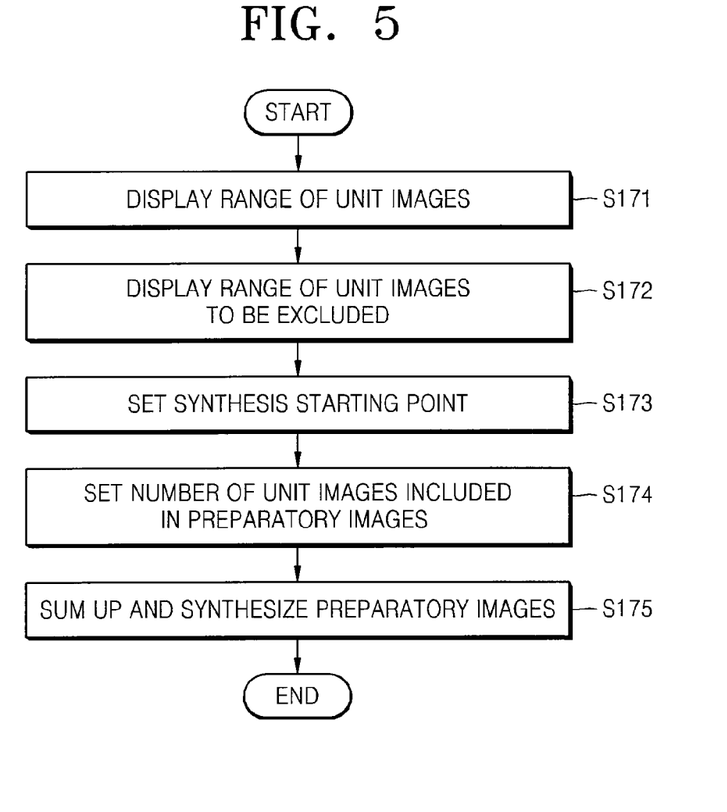
FIG. 5 is a flowchart illustrating examples of sub-operations of an operation of synthesizing preparatory images of the photographing method illustrated in FIG. 4.

FIG. 5 is a flowchart illustrating an example of sub-operations of Operation S170 of creating and synthesizing the preparatory images of the photographing method illustrated in FIG. 4.

Referring to FIG. 5, Operation S170 includes displaying the range of the unit images (S171), setting a synthesis starting point as a starting point of the unit images included in the preparatory images (S173), setting the number of the unit images included in the preparatory images (S174), and summing up and synthesizing the preparatory images (S175).

Operation S170 may include displaying the range of the unit images that are not included in the preparatory images. Operation S172 of displaying the range of the unit images that are not included in the preparatory images may include detecting the movement of the subject from the image data of the unit images and excluding a time period in which the unit images from which the movement of the subject is detected are present, from the overall photographing time.

The user may identify a time period in which the unit images that are not appropriate for use in the final image are present, from the captured unit images and may exclude the time period in which the unit images from which the movement of the subject is detected are present, from the overall photographing time. Thus, failure of photographing due to a variation in rapid movement of the subject during a photographing operation can be minimized.

Figure 6:
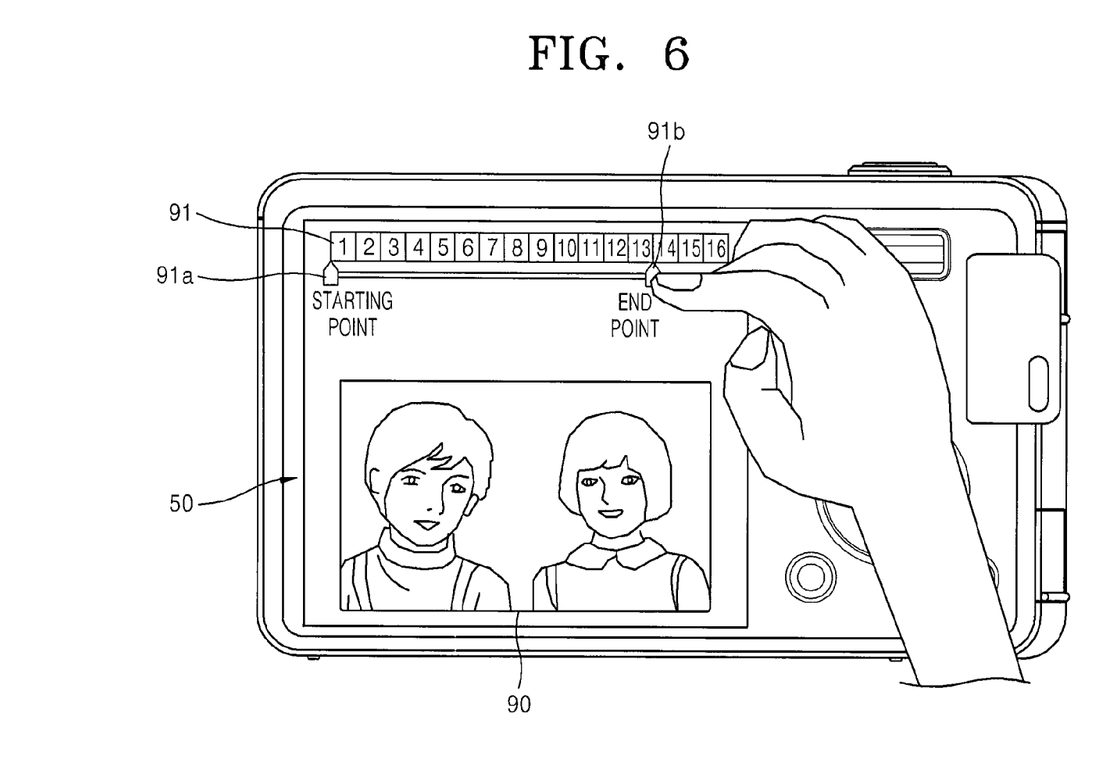
FIG. 6 illustrates an example of a photographing operation performed by the photographing method of FIG. 4.

FIG. 6 illustrates an example of a photographing operation performed by the photographing method of FIG. 4. Referring to FIG. 6, preparatory images 90 and numbers 91 that indicate a time period of unit images included in the preparatory images 90 are displayed on a touch screen 50. The user sets a starting point designation symbol 91a and an end point designation symbol 91b displayed on the touch screen 50 so as to set a starting point of the unit images to be included in the preparatory images 90 and the number of the unit images.

Figure 7:
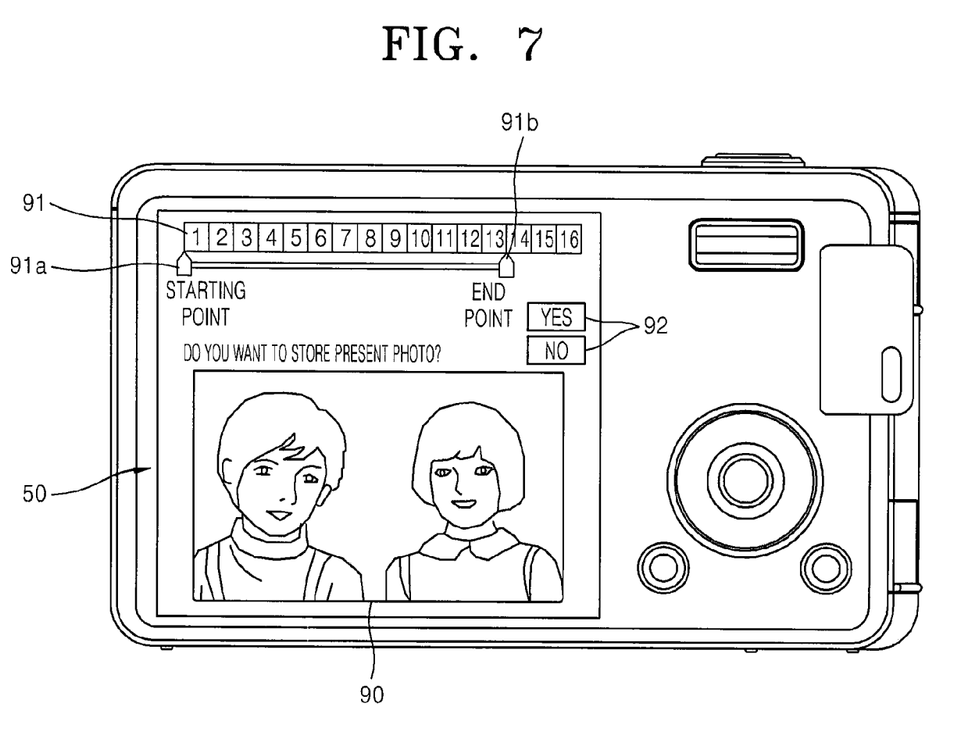
FIG. 7 illustrates an example of an operation of storing photos in the photographing operation of FIG. 6.

FIG. 7 illustrates an example of an operation of storing photos in the photographing operation of FIG. 6. Referring to FIG. 7, the photographing apparatus as shown in FIG. 1 may sum up unit images that are present in a time period set by the user and may display the unit images on the touch screen 50. The user checks the exposure state of the preparatory images 90 displayed on the touch screen 50 and then operates a menu button 92 on the touch screen 50, thereby selecting and storing the preparatory images 90. If the user selects the preparatory images 90, the photographing apparatus finally synthesizes the unit images included in the preparatory images 90 selected by the user so as to create a final image, display the final image on the touch screen 50 and store the final image in a storage unit such as the storage unit 15 of FIG. 1.

The user may set a time period of the unit images by using the numbers 91 that indicates the time period of the unit images displayed on the touch screen 50 after operating a shutter (not illustrated) and performing a photographing operation, the starting point designation symbol 91a and the end point designation symbol 91b. The exposure state of the preparatory images displayed on the touch screen 50 may be checked previously and thus, failure of exposure control when photographing is performed can be minimized. Also, the user can select exposure conditions freely.

Figure 8:
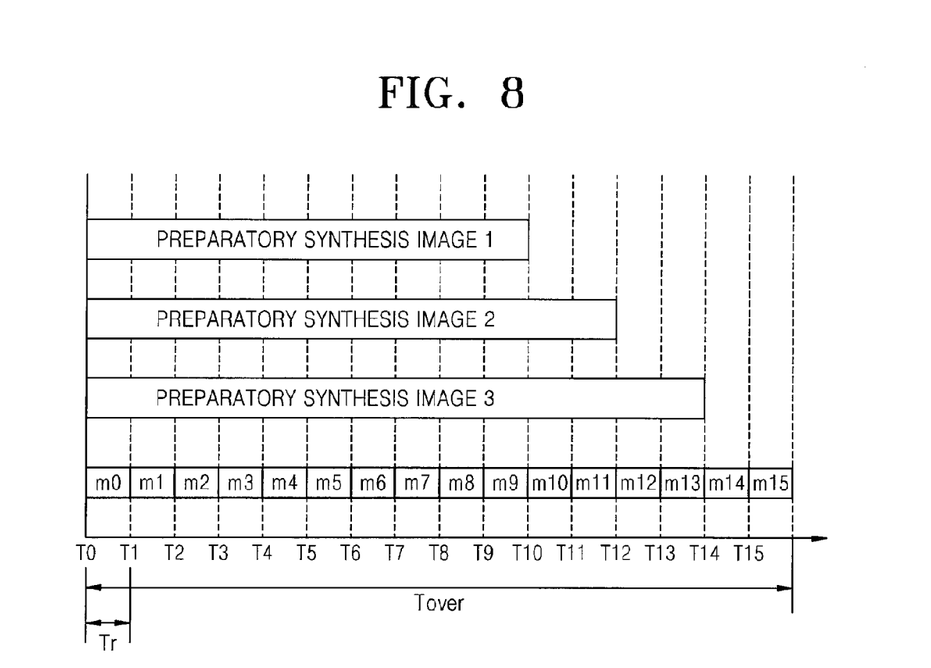
FIG. 8 is a conceptual diagram illustrating an example of a photographing operation performed in the photographing apparatus of FIG. 1.

FIG. 8 is a conceptual diagram illustrating another example of a photographing operation performed in the photographing apparatus of FIG. 1. Referring to FIG. 8, preparatory synthesis images 1 to 3 are examples of preparatory images that are created so as to create a final image. Numbers of unit images included in the preparatory synthesis images 1 to 3 are different but a time when the unit images start is T0. Thus, lengths of the preparatory synthesis images 1 to 3 are different. Thus, when the exposure state of the preparatory synthesis image 1 is insufficient, the user selects the preparatory synthesis image 2 or 3 so that failure of exposure control can be minimized.

Figure 9:
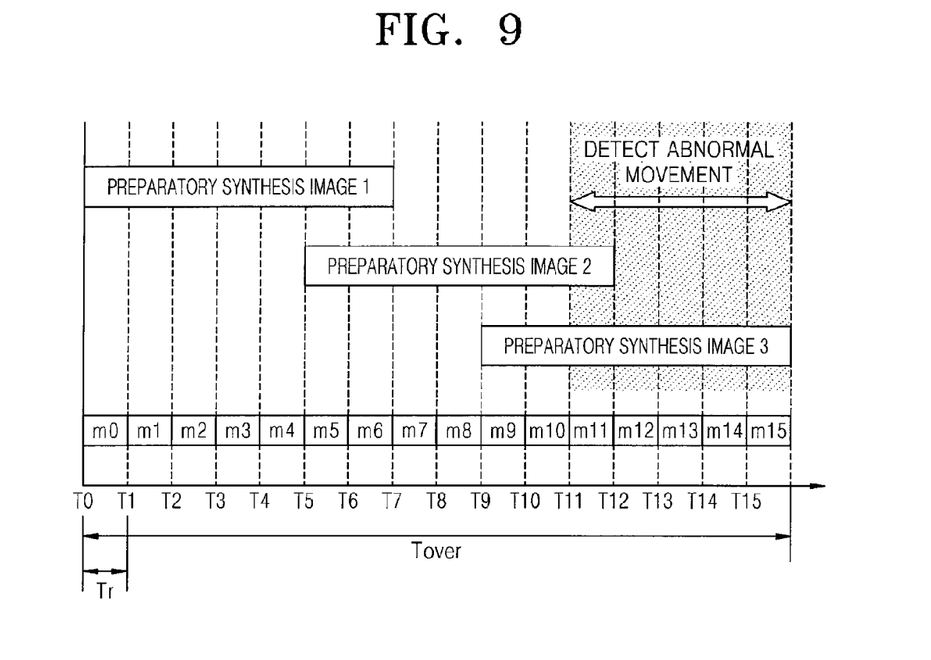
FIG. 9 is a conceptual diagram illustrating an example of a photographing operation performed in the photographing apparatus of FIG. 1.

FIG. 9 is a conceptual diagram illustrating an example of a photographing operation performed in the photographing apparatus of FIG. 1. Referring to FIG. 9, as a result of detecting the movement of the subject from the image data by using a movement detector such as the movement detector 46 of the photographing apparatus of FIG. 1, the unit images in which it was detected that the movement of the subject varies rapidly may not be included in the preparatory images. In FIG. 9, the rapid movement of the subject is detected from the unit images present in a time period of times T11 to T15. Thus, starting points of the preparatory synthesis image 2 and the preparatory synthesis image 3 may be re-adjusted so that the unit images may not cover the time period of the times T11 to T15.

When the unit images present in the time period in which abnormal movement of the subject is detected are not included in the preparatory images, the user may identify a time period in which the unit images that are not appropriate for use in the final image are present, from the photographed unit images and may exclude the time period from the overall photographing time. Thus, failure of photographing due to a variation of rapid movement of the subject during a photographing operation can be minimized.

Figure 10:
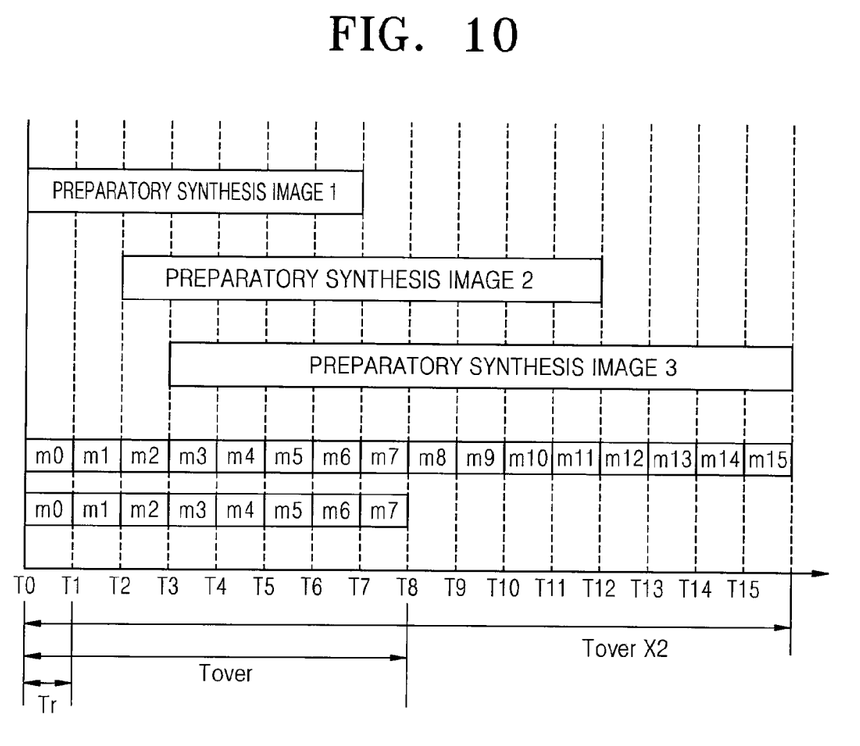
FIG. 10 is a conceptual diagram illustrating an example of a photographing operation performed in the photographing apparatus of FIG. 1.

FIG. 10 is a conceptual diagram illustrating another example of a photographing operation performed in the photographing apparatus of FIG. 1. Referring to FIG. 10, when setting values related to exposure such as a diaphragm value or a shutter speed are automatically determined by the photographing apparatus or the user, a photographing time T required for photographing is determined. In the photographing apparatus according to the above-described embodiments, Tover, which is at least as long as the photographing time T, is set to an overall photographing time, and a plurality of unit photographing operations are sequentially performed during the overall photographing time Tover.

However, in the photographing apparatus performing the photographing operation illustrated in FIG. 10, Tover×2, which is a time corresponding to twice Tover set based on the photographing time T, is set to an overall photographing time, and a plurality of unit photographing operations are sequentially performed over the overall photographing time Tover× 2. In the photographing apparatus performing the photographing operation illustrated in FIG. 10, unit images, which correspond to a time period corresponding to about more than twice the photographing time T set by the user or the photographing apparatus, can be obtained so that the user can select exposure conditions freely so as to create images with appropriate exposure.

In the above-described photographing apparatus and method, unit images that are sequentially photographed during an overall photographing time are summed up to create preparatory images and then, one is selected from among the preparatory images so as to create a final image having optimum exposure so that failure of exposure control can be minimized when photographing is performed. Also, a user can select exposure conditions freely when photographing is performed. Furthermore, the final image can be created by excluding the unit images that are present in a time period in which a subject moves rapidly. Thus, failure of photographing due to a variation in rapid movement of the subject during a photographing operation can be minimized.

Embodiments comprise a computer readable medium encoded with computer-executable instructions to perform a method. The computer readable medium includes RAM memory, flash memory, ROM memory, EPROM memory, EEPROM memory, registers, a hard disk, a removable disk, a CD-ROM, or other forms of computer readable media known in the art.

For convenience, in the description above, the functionality described has been divided into a number of units; however, the number of units may vary and the functionality described above may be differently divided among the units, or the functionality described above may be implemented without units.

The various illustrative units described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present invention has been particularly shown and described with reference to exemplary embodiments thereof, it will be understood by those of ordinary skill in the art that various changes in form and details may be made therein without departing from the spirit and scope of the present invention as defined by the following claims.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus comprising:
   an image pickup unit configured to capture an image of a subject to create image data;
   an image pickup unit controller configured to set a photographing time that is longer than an exposure time required for photographing the subject, configured to divide the overall photographing time into a plurality of unit photographing times, and configured to control the image pickup unit to sequentially perform a plurality of unit photographing operations corresponding to the plurality of unit photographing times to create a plurality of unit images;
   a storage unit configured to store image data of the plurality of unit images created by performing the plurality of unit photographing operations;
   a user inputting unit configured to receive a user's input operation;
   an image synthesis unit configured to sum up the image data of different subsets of the plurality of unit images to create a plurality of preparatory images, and configured to sum up the unit images of a selected one of the plurality of preparatory images in response to the user's input operation to create a final image;
   a display unit configured to display the plurality of preparatory images and to display the final image; and
   a movement detector configured to detect movement of the subject from the unit images;
   wherein the image synthesis unit excludes unit images in which the movement detector has detected movement of the subject,
   wherein the photographing apparatus changes a number of unit images to be included in the preparatory image by changing a starting unit image of the unit images to be included in the preparatory images to exclude the unit images in which the movement detector has detected movement of the subject, and
   wherein the unit images are created to represent the subject with a fixed angle, and the preparatory images and the final image are created to represent the subject with the same fixed angle of unit images.

2. The photographing apparatus of claim 1, wherein the final image has higher resolution than that of the selected preparatory image.

3. The photographing apparatus of claim 1, wherein at least two of the preparatory images are created by summing a different number of unit images.

4. The photographing apparatus of claim 3, wherein at least two of the preparatory images are created by summing unit images beginning at the same starting unit image in the sequentially created unit images.

5. The photographing apparatus of claim 1, wherein at least two of the preparatory images are created by summing unit images beginning at the different starting unit image in the sequentially created unit images and the number of unit images used to create the at least two preparatory images is the same to each other.

6. The photographing apparatus of claim 1, wherein the image synthesis unit determines a number of the unit images to be included in the preparatory image based on the input signal of the user inputting unit.

7. The photographing apparatus of claim 1, wherein the display unit displays symbols or characters corresponding to the unit images over the overall photographing time, and the image synthesis unit determines the number of the unit images to be included in the preparatory image and starting points of the unit images for use in synthesis according to the input signal of the user inputting unit.

8. The photographing apparatus of claim 1, wherein the image synthesis unit is configured to sum up the image data of different subsets of the plurality of unit images to create the plurality of preparatory images directly after the plurality of unit images are created and stored.

9. A photographing method comprising:
   calculating an exposure value for photographing;
   setting an overall photographing time based on the exposure value and dividing the overall photographing time into a plurality of unit photographing times;
   sequentially performing a plurality of unit photographing operations to correspond to the plurality of unit photographing times and storing image data of a plurality of unit images created by performing the plurality of unit photographing operations;
   summing up image data of different subsets of the plurality of the unit images that are present in different time periods of the overall photographing time to create a plurality of preparatory images;
   displaying the plurality of preparatory images;
   receiving a selection of one of the plurality of preparatory images;
   creating a final image by summing up the unit images of the selected one of the plurality of preparatory images;
   displaying the final image; and
   detecting movement of the subject from the image data of the unit images,
   wherein the creating of the preparatory images comprises creating the preparatory images by excluding a time period in which movement of the subject is detected,
   wherein the creating of the preparatory images further comprises changing a number of unit images to be included in the preparatory image by a starting unit image of the unit images to be included in the preparatory image to exclude the time period in which movement of the subject is detected; and
   wherein the unit images are created to represent the subject with a fixed angle, and the preparatory images and the final image are created to represent the subject with the same fixed angle of unit images.

10. The photographing method of claim 9, wherein the final image has higher resolution than that of the selected preparatory image.

11. The photographing method of claim 9, wherein numbers of unit images included in the preparatory images are different from each other.

12. The photographing method of claim 11, wherein starting points of the unit images included in the preparatory images are the same.

13. The photographing method of claim 11, wherein starting points of the unit images of the preparatory images are different, and numbers of unit images included in the preparatory images are the same.

14. The photographing method of claim 11, further comprising:
   receiving a user's selection of the unit images wherein the creating of the preparatory images comprises determining a number of the unit images to be included in the preparatory image based on the selection of the unit images.

15. The photographing method of claim 11, further comprising:
   a user's selection of the unit images wherein the displaying of the preparatory images comprises displaying symbols or characters corresponding to the unit images during the overall photographing time, and the creating of each of the preparatory images comprises determining the number of the unit images to be included in the preparatory image and starting points of the unit images for use in synthesis based on the selection of the unit images.

16. A non-transitory computer-readable medium storing instructions that, when executed by a machine, cause the machine to at least carry out the method of claim 9.

* * * * *